United States Patent Office 3,180,874
Patented Apr. 27, 1965

3,180,874
1,6-DIAZIDOCARBAZOLE AND METHOD FOR MAKING SAME
Henry M. Grotta, Delaware, Ohio, and Myron N. Lugasch, deceased, late of Columbus, Ohio, by Phyllis T. Lugasch, heir, Scranton, Pa., assignors, by mesne assignments, to Martin-Marietta Corporation, New York, N.Y., a corporation of Maryland
No Drawing. Filed Sept. 11, 1963, Ser. No. 308,305
2 Claims. (Cl. 260—315)

The present invention relates to 1,6-diazidocarbazole and to the method for making same.

1,6-diazidocarbazole liberates large quantities of nitrogen gas on being heated, and is therefore useful as a blowing agent for polymers.

Generally speaking, the method of the present invention comprises the steps of reducing 1,6-dinitrocarbazole to form 1,6-diaminocarbazole, tetrazotizing the 1,6-diaminocarbazole to form 1,6-carbazoletetrazonium chloride, reacting the 1,6-carbazoletetrazonium chloride with sodium azide to form 1,6-diazidocarbazole, and recovering the 1,6-diazidocarbazole thus formed.

The following is an illustrative example of the method of the present invention.

1,6-dinitrocarbazole is prepared as follows. A slurry is prepared by adding 167.2 gms. of carbazole to 1280 gms. glacial acetic acid. The slurry is stirred and maintained at 30°–40° C. for 1.5 hours, during which time 70.6 gms. sodium nitrite is added. The slurry is heated and stirred for an additional half hour, following which 10 more gms. of sodium nitrite is added. The result is 9-nitrosocarbazole, mostly in solution, to which is added a solution containing 148 gms. of 90% nitric acid and 148 gms. glacial acetic acid during a period of 1.3 hours, with stirring and cooling to 30°–40° C. The resultant slurry is stirred at 30°–40° C. for 3.5 additional hours, then held at 55° C. for 1.5 hours, then held at 65° C. for 1.5 hours, then held at 95° C. for two hours, cooled to 65° C., filtered, the filtrate discarded, the resulting solid washed with 700 ml. of cold glacial acetic acid, washed with water and dried. 172 gms. of a crude mixture of 1,6-dinitrocarbazole and 3,6-dinitrocarbazole results. To 91 gms. of the crude dinitrocarbazoles is added 6 liters of a 60 gms. per liter solution of potassium hydroxide in absolute ethanol, at 50° C. Two portions result, e.g. potassium salt of 1,6-dinitrocarbazole as insoluble residue, and a solution of the potassium salt of 3,6-dinitrocarbazole. The portions are separated by filtration, and the insoluble residue is digested on a steam bath with 400 ml. of 5% aqueous HCl. The resulting solid is recovered by filtration, washed thoroughly with warm water to remove KCl and any other water soluble impurities, dried, dissolved in hot nitrobenzene, filtered while hot and in solution, and the filtrate cooled to recrystallize the 1,6-dinitrocarbazole, which is recovered by filtration and dried under vacuum. 28.8 gms. of 1,6-dinitrocarbazole solids results.

1,6-dinitrocarbazole may be reduced to 1,6-diaminocarbazole as follows. 28.8 gms. of 1,6-dinitrocarbazole in 576 ml. of ethanol containing 8.6 gms. (wet weight with ethanol) of Raney nickel catalyst is reduced under 800 p.s.i.g. hydrogen pressure at 95°–100° C. for four hours in a stirred autoclave. The solid diamine product is recovered by filtration and separated from the catalyst by dissolving it in aniline. The aniline is evaporated under vacuum and the residue recrystallized from xylene, yielding 2.3 gms. of 1,6-diaminocarbazole in the form of a solid.

The remaining steps are conducted in subdued light.

The 1,6-diaminocarbazole is tetrazotized by making a slurry of 2.3 gms. of 1,6-diaminocarbazole, 14.4 ml. HCl and 72 ml. water, which slurry is cooled to below 10° C. To the cooled slurry is added, with continuous cooling, over a period of 20 minutes a solution of 1.5 gms. sodium nitrite in 7.2 ml. water. The mixture is stirred for 25 additional minutes at a temperature below 10° C. and then filtered to give a solution of 1,6-carbazoletetrazonium chloride.

The solution of 1,6-carbazoletetrazonium chloride is warmed to room temperature, and 14.4 ml. of an aqueous solution containing 2.2 gms. sodium azide is added thereto with stirring. Stirring is continued for two hours and the 1,6-diazidocarbazole precipitate is collected by filtration, washed with water and dried over calcium chloride in vacuo.

What is claimed is:
1. 1,6-diazidocarbazole.
2. A method for making 1,6-diazidocarbazole comprising the steps of reducing 1,6-diaminocarbazole to form 1,6-dinitrocarbazole, tetrazotizing the 1,6-diaminocarbazole to form 1,6-carbazoletetrazonium chloride, and reacting the 1,6-carbazoletetrazonium chloride with sodium azide to form 1,6-diazidocarbazole.

References Cited by the Examiner
Morgan et al.: "J. Chem. Soc.," volume 121, pages 2709–17 (1922).
Sawicki: "J.A.C.S.," volume 77, pages 957–60 (1960).

WALTER A. MODANCE, *Primary Examiner.*
JOHN D. RANDOLPH, *Examiner.*

UNITED STATES PATENT OFFICE
CERTIFICATE OF CORRECTION

Patent No. 3,180,874                                   April 27, 1965

Henry M. Grotta et al.

It is hereby certified that error appears in the above numbered patent requiring correction and that the said Letters Patent should read as corrected below.

Column 2, line 38, for "1,6-diaminocarbazole" read -- 1,6-dinitrocarbazole --; line 39, for "1,6-dinitrocarbazole" read -- 1,6-diaminocarbazole --.

Signed and sealed this 14th day of September 1965.

(SEAL)
Attest:

ERNEST W. SWIDER
Attesting Officer

EDWARD J. BRENNER
Commissioner of Patents